United States Patent Office 2,810,930
Patented Oct. 29, 1957

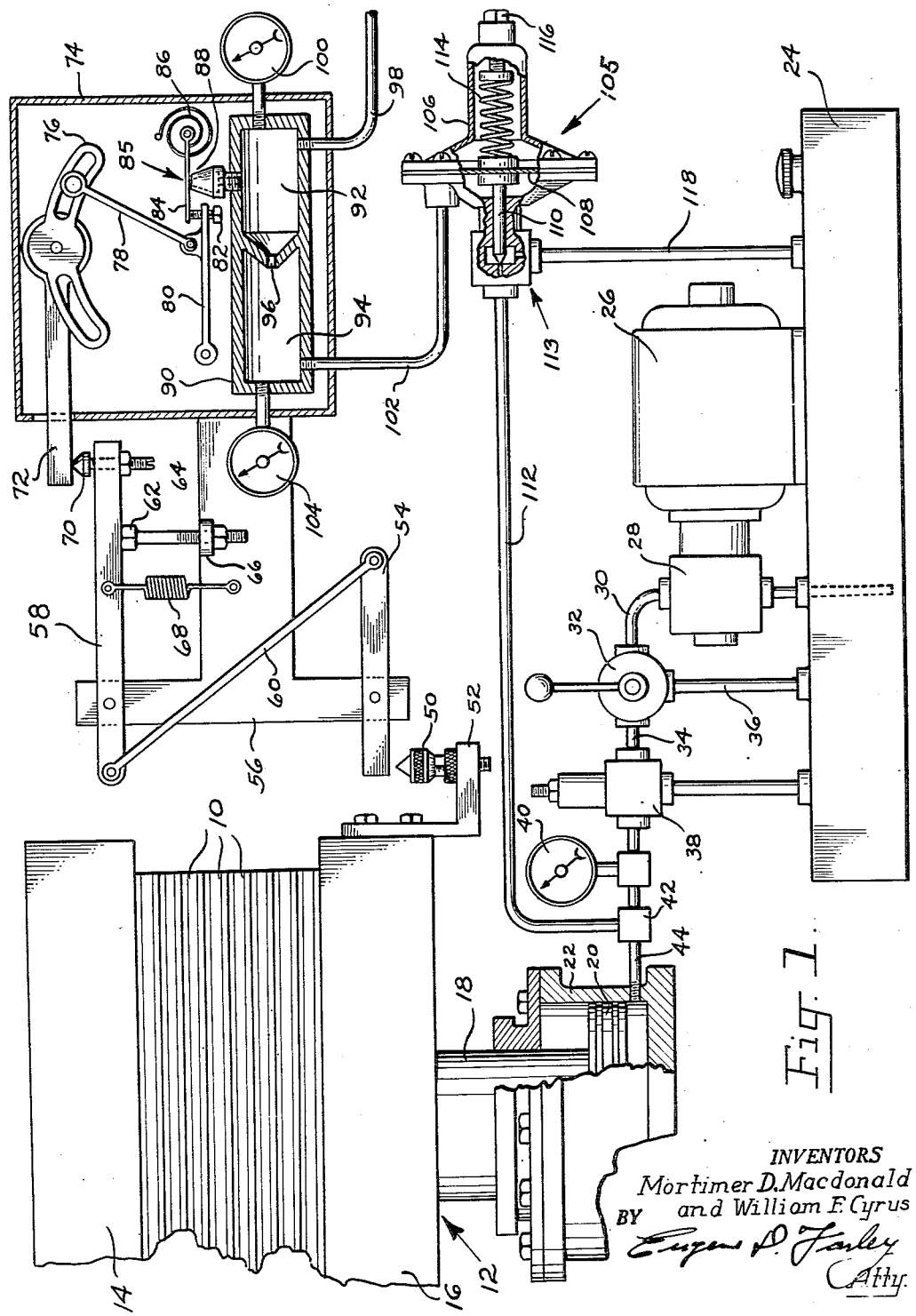

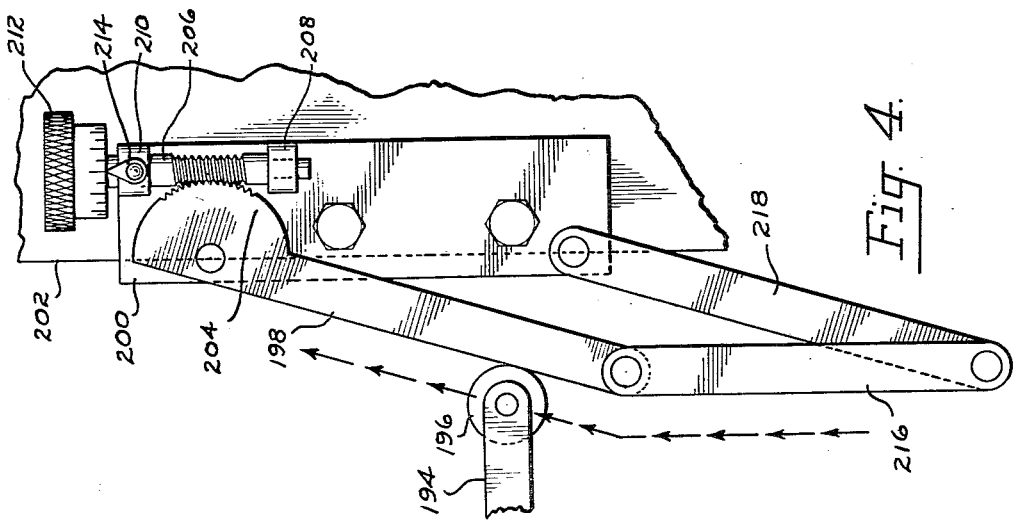
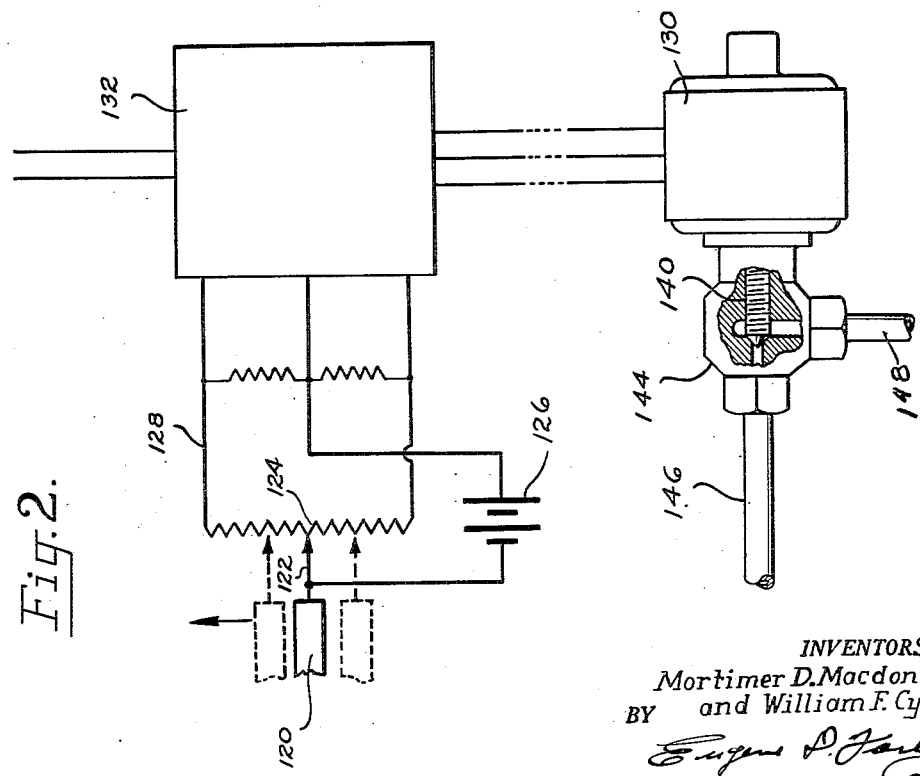

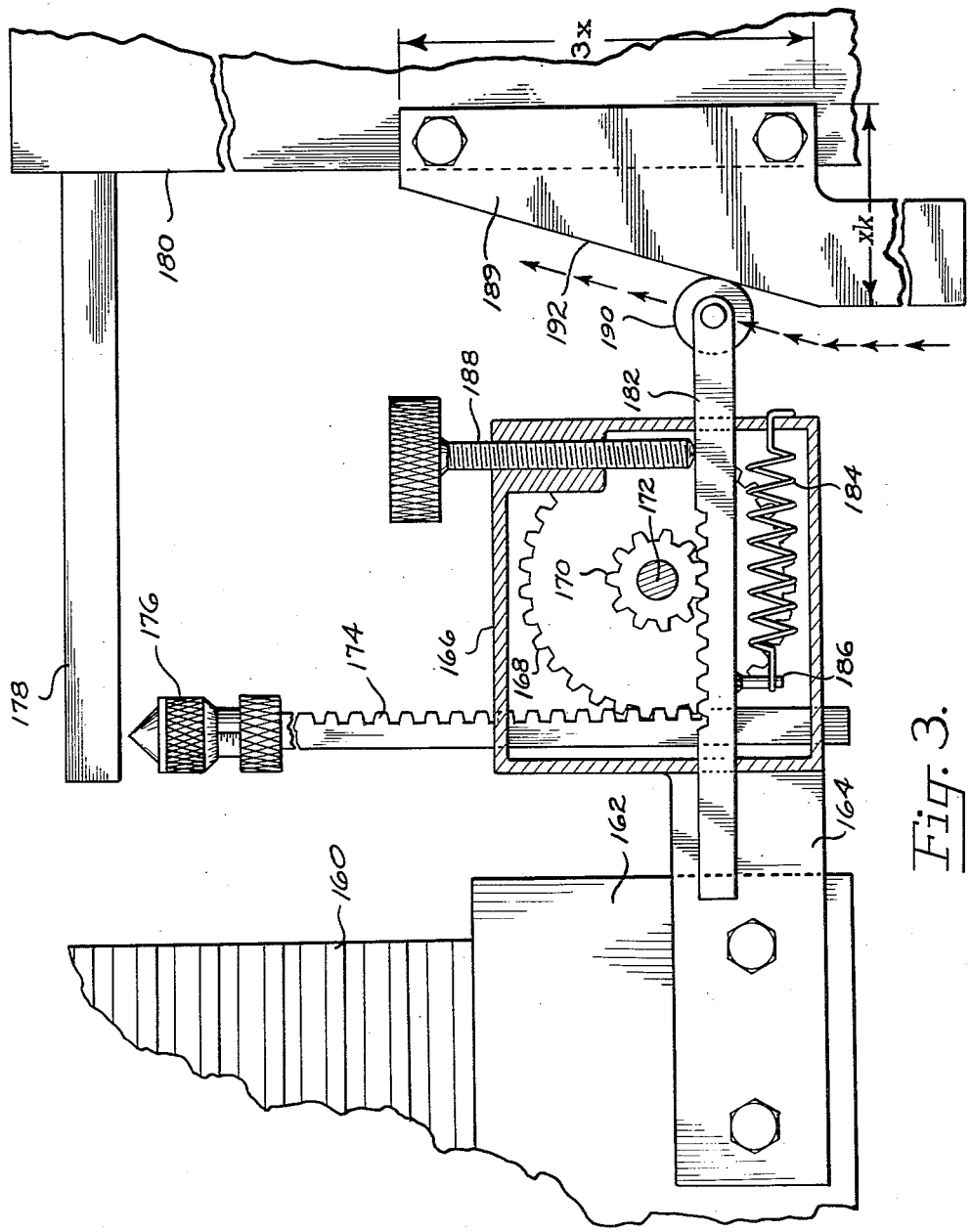

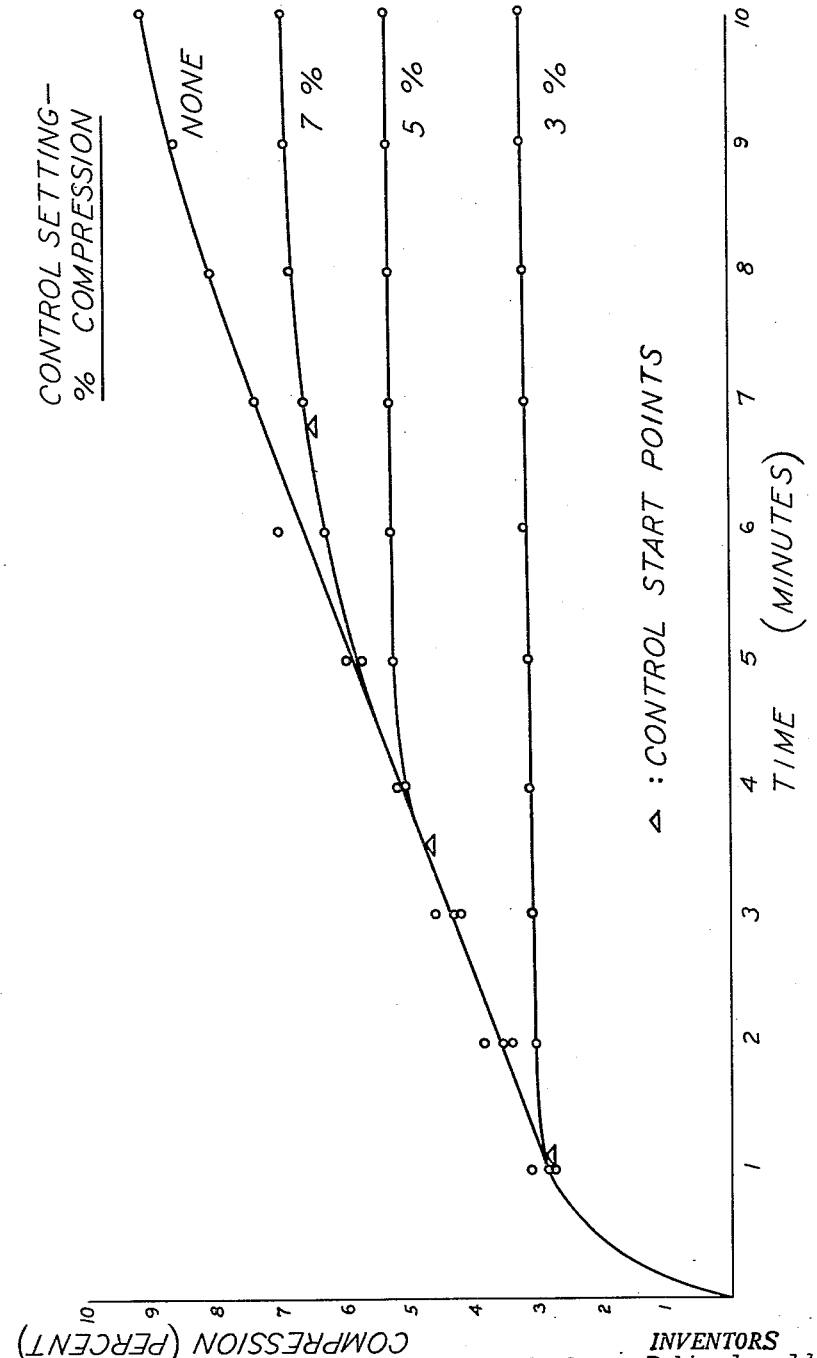

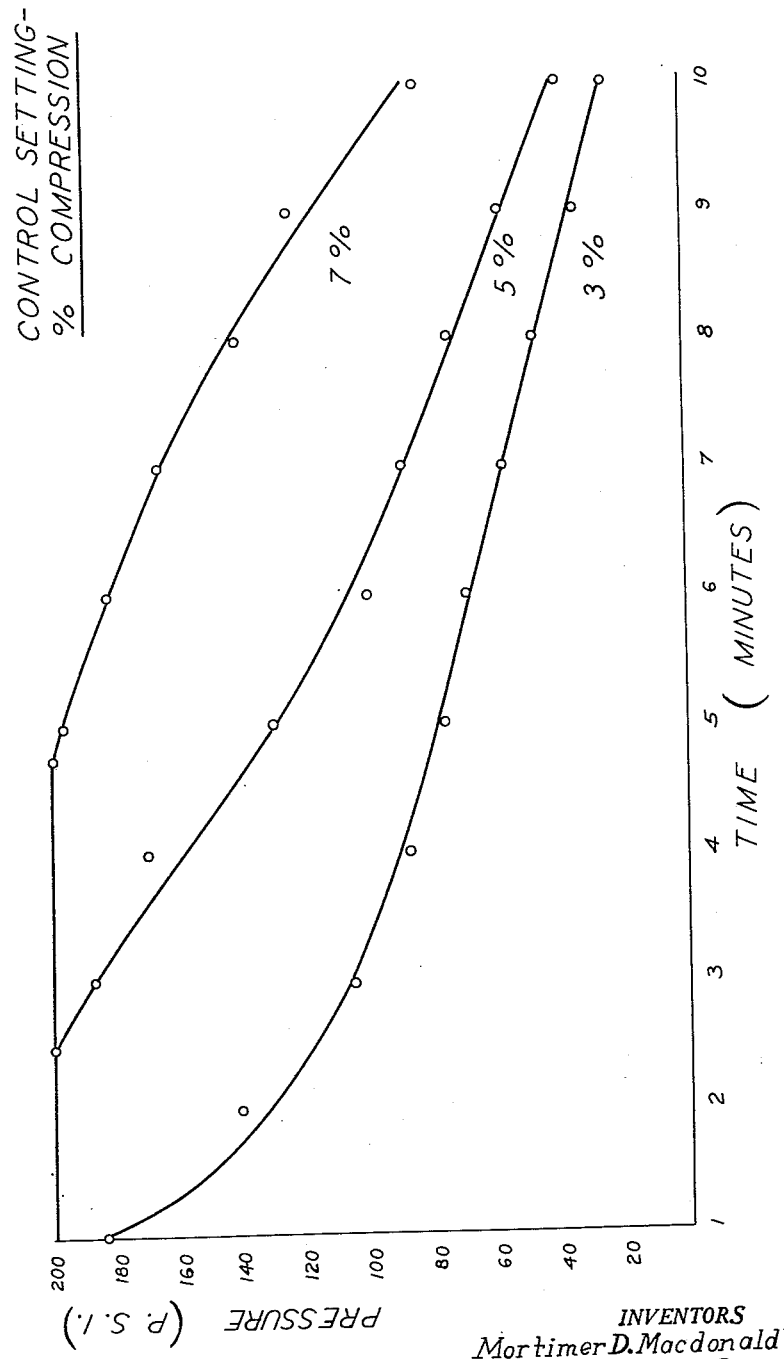

2,810,930

PRESS HAVING THICKNESS CONTROL MEANS

Mortimer D. Macdonald, Corvallis, and William F. Cyrus, Jennings Lodge, Oreg., assignors to the State of Oregon, acting by and through the Oregon State Board of Forestry Application October 6, 1950, Serial No. 188,688

10 Claims. (Cl. 18—17)

This invention relates to apparatus for controlling the closure of presses of the character employed in the manufacture of consolidated products, particularly plywood and consolidated wood particle boards, and to a method of making such products.

In the conventional plywood manufacturing operation, wood veneers coated with a thermosetting adhesive are assembled and stacked in a press, usually an hydraulic platen press, the platens of which are provided with heating means. They then are subjected to heat and pressure for a predetermined time period in order to press the veneers together, set the adhesive, and form the plywood panels.

Since the veneers employed in making plywood are of varying thickness, this being a result of their rapid and inaccurate production from peeler logs on a veneer lathe, it is necessary that the assemblies be subjected to very substantial pressures to avoid the formation of voids between the veneers and to insure that the latter are in contact with each other uniformly across their entire surfaces. Unfortunately, it is the present practice to apply pressures far in excess of those theoretically required to attain the foregoing result, thereby compressing the wood more than is necessary.

For example, it is not unusual to compress the wood by as much as 15% of its thickness, whereas 3% may be sufficient to secure uniform contact of the veneers. This means that, in order to produce plywood panels of a specified thickness, the veneers must be cut sufficiently thick to allow for this large amount of compression. The resulting inefficient utilization of the wood is apparent, as much as 10% or more of the peeler log volume being lost because of overcompression. Furthermore, because of the inherent resiliency of the wood, overcompression of the veneers amplifies the problems of grain raising encountered during the use of the plywood panels.

Similar problems of overcompression and inefficient utilization of the raw material are met in the production of consolidated products such as fiber boards made from wood or other lignocellulose fibers, wood particle boards made from shavings, chips or other waste wood material, veneered or faced composite boards, and plywood or laminated core stock overlaid with consolidated particle layers. In all of these processes, unconsolidated mats composed of cellulosic fibers or analogous raw materials are compressed until they are consolidated to the desired degree and maintained in this state by means of native or added binders. In the manufacture of hardboard, for example, wood fibers are deposited in a felt or mat from an aqueous slurry (wet process) or from air (dry process). The felt then is subjected to heat and pressure to drive off the excess moisture, consolidate the fibers, and bind them together through the adhesive action of native or added binder, forming a board product of the desired density and thickness. As in the case of plywood manufacture, however, the pressure applied conventionally is far in excess of that required to cause the binding together of the wood particles and the development of the desired properties in the board. As a result, there is overcompression of the wood, again resulting in the waste of a substantial proportion of this valuable raw material.

It, therefore, is the general object of the present invention to provide a method and apparatus for making consolidated products wherein the optimum pressure is applied for securing the necessary compression of the material without substantial overcompression thereof.

It is another object of the present invention to provide method and apparatus for the manufacture of plywood from wood veneers of uneven thickness, wherein the veneers are compressed by the minimum amount necessary to iron out dimensional irregularities and promote uniform bonding of the veneers across their entire surface area.

Still another object of the present invention is the provision of method and apparatus for the production of plywood which is relatively free from problems of grain raising.

Another object of the present invention is the provision of method and apparatus for the production of consolidated products having specified dimensions and properties from a minimum amount of unconsolidated raw material, thereby effecting substantial conservation of the same.

Still another object of the present invention is the provision of press apparatus for making consolidated products which apparatus may be closed a predetermined but variable extent, thereby effecting a predetermined amount of compression in the press load.

Still another object of the present invention is the provision of press apparatus which may be closed a predetermined extent, the degree of closure being adjustable as required by specifications to be met by the consolidated product.

Still another object of the present invention is the provision of press apparatus which is adjustable to compress loads of varying thickness to a predetermined constant percent thereof.

Still another object of this invention is the provision of press apparatus adapted to compress a load placed therein to a predetermined degree with a minimum application of pressure and resulting power economy.

Still another object of the present invention is the provision of press control apparatus which is versatile and applicable to a wide variety of presses operated by a variety of power mechanisms and heated from a variety of sources.

The manner in which the foregoing and other objects of the present invention are accomplished will be apparent from the following specification and claims considered together with the drawings wherein:

Figure 1 is a view in elevation, partly in section, of the herein described press control apparatus;

Figure 2 is a schematic view of alternate mechanism for controlling the press apparatus of Figure 1;

Figure 3 is a detail view in elevation, partly in section, of mechanism useful in adjusting press control apparatus similar to that of Figure 1;

Figure 4 is a fragmentary view in elevation of an alternate construction for the adjusting mechanism of Figure 3 whereby the extent of closure of the press may be adjusted to a predetermined percentage of the thickness of its load;

Figure 5 is a graph illustrating the relationship between the amount of compression and the press time in fabricating plywood in apparatus controlled in the manner described herein; and Figure 6 is a graph illustrating the relationship between the pressure exerted by the movable member of the press and the press time when manufacturing plywood by the presently described method.

Generally stated, the presently described method of making consolidated products comprises subjecting compressible blanks to a consolidating pressure. The degree of consolidation of the blanks then is measured, the applied pressure being reduced when the predetermined degree of consolidation has been effected. Thereafter the pressure is adjusted as necessary to maintain the predetermined degree of consolidation until dimensional stability of the consolidated product has been attained.

For example, in the manufacture of plywood, the thickness of the press load first is measured. Then, knowing the extent of thickness irregularity of the component veneers, the degree of consolidation of the load necessary to iron out these irregularities and produce uniform surface contact may be calculated. Thus, if the press load is 100 inches thick and 4% compression thereof is necessary to iron out the surface irregularities with a comfortable margin of safety, compression of the load until it is 96 inches thick is indicated.

Sufficient pressure then is applied to effect this consolidation, for example 200 p. s. i. Instead of maintaining this pressure after the desired consolidation has been effected, as is presently the practice, the pressure is reduced until it is just sufficient to balance the resiliency of the press load, for example to about 80 p. s. i. If the load resiliency tends to open the press beyond the allowed limit, the pressure is increased. Usually, however, the pressure gradually decreases with press time. This balanced or equilibrium condition is maintained in the press until the heat from the heated platens has penetrated to the interior veneers, setting the glue and bonding the veneer surfaces firmly together. The press then may be opened and the panels removed, the panels being dimensionally stable and compressed by the minimum amount necessary to secure uniform bonding.

Generally stated the apparatus for effectuating the above described method comprises a press, preferably one equipped with a movable platen. The latter carries contact means adapted to contact amplifying means stationed adjacent the press. By means of the latter, very slight movements of the movable member of the press are transmitted to control mechanism which controls the pressure applied in the press.

If, for example, the press employed is a conventional, hydraulic press, the control means may vary the pressure of hydraulic fluid supplied to the ram. Originally, a substantial fluid pressure is applied. However, after the contact means on the movable platen has contacted the amplifying means, the press closure control mechanism operates to bleed off some of the hydraulic fluid so that the pressure exerted by the ram is decreased. As contact of the contact means with the amplifier continues, the bleeding off of the hydraulic fluid is increased still further with the result that the pressure applied by the ram is reduced from its originally high value to progressively lower levels as press time increases. In this manner, closing of the press and compression of the load to a predetermined percentage of its original thickness is accomplished.

Considering the process of the present invention in greater detail and with particular reference to the drawings:

The blanks to be consolidated, for example the plywood assemblies 10, are contained in a suitable press, for example the hydraulic platen press indicated generally at 12. The press comprises a fixed platen 14 and a movable or thrust platen 16. Both of these platens may be provided with means for heating them to a predetermined temperature calculated to set the adhesive with which the wood veneers comprising the plywood assembly have been coated. In the conventional press, the heating means may comprise steam pipes situated within the platens. Alternatively, the platens may be heated electrically or by liquid heat transfer media, or the plywood may be heated by radio frequency methods.

The thrust platen 16 preferably is actuated hydraulically, although fluid actuated means in general, as compressed air, or even mechanical means may be used for effecting its reciprocation between open and closed positions. In the illustrated embodiment, the platen 16 is actuated by means of the piston rod 18 connected to piston 20 which reciprocates within the hydraulic cylinder 22.

Cylinder 22 is supplied with hydraulic fluid from the reservoir 24. A motor 26 drives pump 28 which pumps fluid from the reservoir through conduit 30 to the control valve 32. This may be a conventional, three-way hydraulic valve which directs the flow of fluid either to the hydraulic cylinder 22 via conduit 34 when the apparatus is in operation, or returns it to reservoir 24 via conduit 36, when the press is not being used. In the former case, the fluid passes through a conventional overload or pressure release valve 38, gauge 40, T connection 42, and thence to the hydraulic cylinder behind the piston via conduit 44. Then when oil is pumped to the cylinder, it lifts the piston therein and connected thrust platen 16, compressing the load within the press. However, when valve 32 is adjusted so that oil is not pumped to the cylinder and line 36 communicates with the same, fluid will return to reservoir as the press opens by gravitation.

To limit the closing of the press to a predetermined value, means are provided for diverting or bleeding off some of the fluid supplied to the cylinder by the pump, the amount of bleed-off being proportional to the reduction in pressure desired. To this end, the thrust platen 16 is provided with contact means which, in the illustrated embodiment, comprise a micrometer 50 mounted on the bracket 52 connected to the platen. Separated from the contact member of micrometer 50 by a spaced distance, determinative of the degree of compression effectuated by the press, is an amplifying mechanism adapted to magnify minute movements of the thrust platen of the press and thus increase the sensitivity of the apparatus.

The amplifying mechanism comprises the lever 54 pivotally attached to the structural member 56 and interconnected with the lever 58 by means of the link member 60 pivotally connected at its lower end to the long arm of lever 54 and at its upper end to the short arm of lever 58. Although the relative proportions of the lever system employed may be varied to achieve any desired sensitivity, it is preferred that the levers be proportioned and arranged so that movement of the short arm of lever 54 results in a four- to twelve-fold movement of the long arm of lever 58.

Lever 58 is maintained in a selected rest position by means of stop 62, which may be threaded for adjustment into a boss 66 extending laterally from frame member 56. It may be returned to this position after upward displacement during operation of the apparatus by suitable means such as the coil spring 68 interconnecting the frame member 56 and the lever 58.

The outer terminal portion of lever 58 carries a contact member 70 which, for adjustment and to compensate for wear, may be a micrometer threaded into the lever arm. The head of the micrometer contacts the free arm of a lever 72 which extends outwardly from a housing 74 in which the bleed control mechanism is contained.

Lever 72 is rigidly attached to the arcuate, slotted lever 76. The slot in the latter adjustably receives one end of a pivotally mounted link member 78, the other end of which is pivotally connected to lever 80 which, in turn, is pivotally connected to the housing 74. The free end of lever 80 has threaded therethrough an adjustment screw 82 which contacts the flapper 84 of a valve 85. Flapper 84 also is pivotally connected to housing 74 and is urged resiliently into contact with screw 82 by resilient means such as the coil spring 86.

The nozzle or jet 88 of the flapper valve communicates with the interior of an air metering device 90. This comprises a hollow cylinder divided into a first chamber 92 and a second chamber 94, these being interconnected by means of a conical metering orifice 96. Chamber 92 communicates through conduit 98 with a source of compressed air at constant pressure and is fitted with a pressure gauge 100. Chamber 94 communicates with a bleed control valve through a conduit 102 and is provided with a pressure gauge 104. Since jet 88 communicates with the chamber 92, it will be apparent that the amount of air finding its way into chamber 94 through orifice 96 will be determined by the setting of the flapper 84 of flapper valve 85.

Thus, if the flapper valve is substantially closed, a correspondingly large amount of air will pass through orifice 96 into chamber 94 and the pressure therein will increase accordingly. However, if the flapper valve is substantially open, then the air entering chamber 92 via conduit 98 will largely pass into the housing 74, whence it escapes to the exterior by way of a suitable opening therein, for example the opening through which extends lever arm 72. In this case, the pressure in chamber 94 will be correspondingly low. Thus it is apparent that the adjustment of the flapper valve, which is accomplished by movement of the thrust platen of the press through the contact member of micrometer 50 and the interconnecting lever system, may be used to vary the pressure in chamber 94 of the metering device.

The resulting fluctuations in pressure may be used to control the amount of hydraulic fluid supplied to the press. Conduit 102 emanating from chamber 94 communicates with the interior of a suitable diaphragm control valve, one form of which is indicated at 105. It comprises a housing 106 divided into two chambers by means of a diaphragm 108. The latter carries the needle 110 of a needle valve 113 which is urged into seating relationship with the outlet of conduit 112 by resilient means such as a coil spring 114 placed on the side of the diaphragm opposite needle 110 and adjustable by means of screw 116. It will be apparent that the fluctuating pressure in chamber 94 of the metering mechanism will be transmitted directly to the pressure or working side of diaphragm valve 105. This, in turn, will cause a corresponding opening and shutting of the needle valve 113. The latter controls the flow of hydraulic fluid through the bypass line comprising conduits 112 and 118. Hence, when the needle valve is open, a proportionately large amount of hydraulic fluid will pass through the bypass line and return to the reservoir 24, this reducing correspondingly the amount of fluid supplied to hydraulic cylinder 22 and the pressure exerted by the piston thereof. However, when needle valve 113 is closed, which occurs when a reduced pressure is present on the working side of the diaphragm valve, substantially all of the hydraulic fluid delivered by pump 28 will be transmitted to the hydraulic cylinder 22 and the pressure exerted by the piston therein will be correspondingly great.

Although the desired control of the pressure bleeding system may be accomplished mechanically by means of a diaphragm pressure control valve in the manner described above, it also may be accomplished electrically by means of a conventional electric motor valve such as is illustrated schematically in Figure 2. In this embodiment, the contact member is attached to an arm 120 which corresponds to bracket 52 of the embodiment of Figure 1 and which may be affixed rigidly to the thrust or movable platen of the press. Rigidly attached to the member 120 is the electrical contact member illustrated schematically at 122 which is designed to traverse the electrical resistor 124 supplied with electric energy from batteries 126. As long as electric contact member 122 remains in its neutral (solid line) position, the bridge circuit 128 is balanced. However, as the member 122 is displaced, either upwardly or downwardly (dotted line positions), a difference in potential is impressed across the lines of the bridge circuit. This may be transmitted through suitable amplification to the field coils of an electric motor 130. The electric motor, in turn, may be used to open and close a valve as determined by its direction of rotation.

Thus the motor may comprise an armature rotatably mounted intermediate the poles of an electro magnet wound with conducting material connected to the above described bridge circuit through an amplifier 132. The armature is rotatably mounted in the housing in such a manner as to be movable in an axial direction, and carries a threaded valve stem 140.

The outer end of valve stem 140 may be tapered to form the needle member of a needle valve 144 which operates to control the flow of hydraulic fluid through conduits 146, 148. In function, valve 144 is analogous to valve 113 of Figure 1, while conduit 146 is analogous to bypass line 112 leading from the T connector 42 of that figure, and conduit 148 is analogous to line 118 leading to the reservoir 24 of the same figure.

Hence, as the contact arm 120 associated with the thrust platen moves from its neutral or solid line position at which no current goes through the system to an operative position such as one of the dotted line positions of Figure 2, current flows through the circuit in a first direction, rotating the armature of the motor correspondingly, for example in a clockwise direction, which closes needle valve 144 and increases the fluid pressure supplied to the thrust platen. However, if the press closes until contact arm 120 is in the other of its dotted outline positions, a second circuit will be established. This will reverse the polarity of the motor field, and cause the rotation of the armature in a counter-clockwise direction, thereby opening needle valve 144 and permitting the flow of fluid through the bypass line including conduits 146 and 148. As a result, the pressure of fluid supplied to the thrust platen will be reduced.

*Operation*

The manner of operation of the above described press control apparatus is as follows:

First, a load of plywood assemblies, unconsolidated fibrous mats, lumber to be faced with veneers, or similar materials is placed between the platens of the press. The press then is closed until contact is made between the load and the upper platen, but without the application of substantial pressure. It then is in its zero or starting position.

The amount of compression desired then is calculated. As has been explained above, in the case of plywood manufacture, this is based upon the compression required to iron out the irregularities in the veneer surfaces and to afford overall contact therebetween.

Next the space between the contact member 50 and the free arm of lever 54 is adjusted until it is equal to the distance which must be traveled by the thrust platen in accomplishing the desired compression. For example, the stack of unglued plywood panels between the platens of the press may be 100 inches thick, and it has been calculated that 3% compression is necessary to effect perfect bonding. Allowing a 1% margin of safety, this makes a total compression of 4%. Then the space to be left between contact member 50 and the free end of lever 54 will be 4% of 100 inches (the total thickness of the press load), or 4 inches. This means that the press will close until the load has been compressed to a total thickness of 96 inches, whereupon the contact member 50 will be in contact with lever arm 54.

As soon as such contact is established, lever 54 operates lever 58 through connecting link 60. The contact member 70 on the end of lever 58 then operates lever 72, which, in turn, operates lever 76 and, through link 78, lever 80. This closes flapper valve 85 and forces air from chamber 92 into chamber 94 of the metering mechanism.

As a consequence, the pressure in chamber 94 is increased which, in turn, increases the pressure on the working side of the diaphragm valve 104. The needle valve operated by the diaphragm then is opened permitting the flow of hydraulic fluid through bypass lines 112, 118 and releasing pressure on the thrust platen. This arrests the motion of the platen at exactly the desired compression stage.

If, following such arresting of the platen motion, the resiliency of the wood in the press causes the thrust platen to retract slightly, thereby separating contact point 50 and lever 54, then the reverse action occurs. Spring 68 immediately returns lever 58 toward its position of rest against stop 62, whereupon the flapper 84 of the flapper valve is opened, reducing the pressure in chamber 94 of the metering device and in the chamber on the working side of the diaphragm valve 105. This further closes needle valve 113, restricts the flow of fluid through the bypass line including conduits 118, and increases the pressure exerted by the thrust platen, closing the press until contact point 50 again is in contact with the lever 54. In this manner, the press is maintained in a state of equilibrium exactly at the desired compression stage, an accuracy of ±0.0025 inch being easily obtainable by means of the described control.

The operation of the embodiment of Figure 2 is analogous to that described above with the exception that, instead of actuating a fluid operated control valve, the contact arm of the thrust platen actuates an electric motor pressure control valve in the manner which already has been described.

Control adjustment

From the foregoing, it is evident that, although the apparatus illustrated in Figures 1 and 2 effectively controls the percent compression of a press load, it may be necessary to adjust the position of contact point 50 relative to lever 54 upon the introduction into the press of loads of varying thickness. It would be desirable, furthermore, to provide an automatic control which automatically would regulate the distance between these two members to a predetermined value irrespective of the thickness of the press load. Still further, it would be desirable to provide such control means in a form such that the percentage compression could be varied as desired or necessary. Control means accomplishing these purposes are illustrated in Figures 3 and 4.

In the embodiment of Figure 3, a load of plywood assemblies 160 is illustrated as being contained in a press, the lower or thrust platen 162 of which corresponds to platen 16 of the press of Figure 1. Rigidly affixed to thrust platen 162 and extending laterally therefrom is the arm 164 on which is mounted a housing 166. This housing contains mechanism for mounting a contact member adapted to contact the press control apparatus, and for adjusting its position relative thereto.

Rotatably mounted within the housing are a pair of gears 168, 170 having a selected gear ratio, for example a ratio of 3 to 1. These may be fixed to a common shaft 172. Extending vertically through registering openings in the top and bottom panels of housing 166 and slidable therein is a toothed bar or rack 174 having affixed to its outer extremities a micrometer 176. The latter serves as the contact point for contacting lever 178 which corresponds to lever 72 of the construction of Figure 1. It operates the press control mechanism which is contained in a casing 180 and which may correspond to that contained in casing 74 of Figure 1.

Extending substantially horizontally from casing 166, as by being slidably mounted in registering slots in opposite sides thereof, is a second arm 182 which, like arm 174, is toothed. However, whereas the teeth of arm 174 engage the teeth of gear 168, those of arm 182 engage the teeth of the smaller gear 170.

Associated with arm 182 are means for resiliently urging it in an outward direction, and for fixing it in selected positions. Thus there may be a coil spring 184 attached at one of its ends to housing 166 and at the other to a projection 186 affixed to arm 182. A screw 188 is threaded through the casing 166 and is adapted to bear frictionally against arm 182, thereby causing the latter to bind in the slot in which it moves and serving as stop means for fixing its position.

Arm 182 is adapted to engage and follow a guide 189 affixed to a structural member, as housing 180, and, to this end, has a wheel 190 mounted on its outwardly extending end. This wheel is adapted to follow or track on the inclined surface 192 of the guide member as the thrust platen 162 raises and lowers. This, in turn, causes the extension and retraction of arm 182 by an amount commensurate with the slope of the guiding surface 192. Movement of arm 182 causes rotation of gears 170 and 168, both of which are rigidly affixed to shaft 172. Since the teeth of gear 168 mesh with the toothed portion of arm 174 carrying contact point 176, it will be apparent that this arm also will reciprocate, but in a vertical direction. As a result, by predetermining the slope of the inclined guide surface 192, it is possible to provide a convenient method of controlling the extent of compression of the press load.

Vertical reciprocation of arm 174 is controlled as a percentage of the vertical reciprocation of the movable press platen 162 through transfer and conversion of angular tracking of the inclined guide surface 192 with wheel 190 into proportional movement of arm 174. Conversion of the slope of the guide surface into the desired lineal movement of arm 174 is accomplished through proper correlation of the ratio between gears 168 and 170 with the degree of slope of the inclined guide surface. For example, using the indicated ratio between gears 168 and 170 of 3 to 1, the slope of the inclined surface 192 is that of the hypotenuse of a right triangle, the vertical leg of which is 3X and the base of which is X times 1 minus the desired degree of compression (K) that the load will be subjected to. If 5% compression of the load is desired, the correct slope of the inclined guide surface will be the hypotenuse of a right triangle whose elevation is 3X and whose base is X times 0.95. The actual altitude of the triangle forming the guide surface is determined by the total length of possible travel of tracking wheel 190.

By an adjusting mechanism such as is described above, it is easily possible to set automatically the contact member 176 the requisite distance below lever 178, no matter what the thickness of the press load, in order to effect a given degree of compression thereof. However, if it is desired to vary the degree of compression from time to time, depending upon the nature of the material charged to the press, it may be desirable to provide means for modifying the automatic control accordingly. This may be accomplished by providing means for varying the slope or inclination of the guiding surface 192 of Figure 3 in a manner which is illustrated in Figure 4. In the construction of the latter figure, the arm 194, equipped with roller 196, corresponds to arm 182 and roller 190 of Figure 3. Roller 196 is adapted to track on the guide member 198, corresponding to the guiding surface 192 of the previously described embodiment.

The slope of guide member 198 is, however, adjustable. It is mounted pivotally on a bracket 200 attached to the structural member 202 which may be the housing containing the valve control mechanism. The terminal portion of guide member 198 may be formed with an arcuately formed toothed projection 204, the teeth on which engage screw 206 rotatably mounted in bosses 208, 210 extending outwardly from the bracket 200. Screw 206 is provided with a knurled head 212 having a scale marked thereon so that an indicator 214 on boss 210 may be employed to indicate the extent of rotation of the screw.

To stabilize guide member 198, the lower terminal portion thereof may be pivotally connected to a first link member 216, which, in turn, may be connected pivotally to the terminal portion of a second link member 218. The latter then may be pivotally connected to bracket 200. Hence it will be apparent that, by rotating screw 206, the slope of guide member 198 may be adjusted to a value corresponding to a certain degree of compression of the press load, as indicated on the calibrated scale on the knurled screw head 212.

The operation of the automatic adjusting mechanism is as follows:

Referring again to Figure 3, let it be assumed that a charge of unglued, plywood panel assemblies 160 has just been placed within the press. Screw 188 then is adjusted to release arm 182 so that it is free for horizontal movement. When this has been done, spring 184 will urge the arm outwardly until the roller thereon engages the guiding surface 192. The thrust platen 162 then is moved upwardly to close the press. During this motion, arm 182 following guide surface 192 will extend outwardly progressively further, rotating gears 170 and 168 and hence withdrawing arm 174 carrying contact member 176 by an amount determined by the slope of guiding surface 192 and the ratio between gears 168 and 170.

As soon as the closing of the press has been effected, but before the application of substantial pressure to the charge, screw 188 is tightened upon arm 182, whereupon it serves as a stop to prevent the further tracking of the guide surface 192 by this arm and hence prevents any further movement of arm 174. The apparatus thus is locked in a position at which contact member 176 is spaced apart from lever 178 by a distance which is exactly commensurate with the desired degree of closure of the press.

Pressure then is applied to the load, compressing it and causing bracket 164 with the adjusting assembly which it carries to move upwardly along with the platen. This occurs with no further relative movement of arm 182 or of arm 174. The closing of the press continues until contact member 176 engages lever 178, which then operates the mechanism for reducing the force applied to the thrust platen so that no further closure occurs, in the manner described above.

The operation of the adjusting mechanism of Figure 4 is analogous to that of Figure 3 with the exception that adjustment may be made to vary the slope of the inclined guiding surface 198. First the scale on screw 212 is calibrated to indicate degrees of compression within the working range. Then, when it is desired to compress a given load by a given amount, for example 5%, screw 206 is turned until this is indicated on the scale. Adjustment of the screw will, of course, adjust the inclination of guide member 198 so that, upon closing the press in the manner explained above, arm 194 will have extended to a position such that the contact member carried by the adjusting assembly is spaced apart from the lever arm operating the control mechanism by the distance required to give 5% compression. Adjustment of the apparatus to give other degrees of compression may be effectuated from time to time in the same manner as necessary or desirable.

*Examples*

The following examples illustrate the applicability of the presently described method and apparatus and the precision of control obtainable over the degree of compression, in the fabrication of plywood.

Three-ply plywood assemblies, the core veneers of which were coated with phenolic resin adhesive in the conventional manner, were introduced into a press having substantially the construction illustrated in Figure 1, two panels per press opening being thus introduced. The platens of the press were maintained at a temperature of 280° F. After closing of the press upon the load but before the application of substantial pressure, the contact member on the thrust platen was adjusted with respect to the lever of the control mechanism so that a 3% compression of the press load would be obtained.

200 p. s. i. hydraulic pressure then was applied to the thrust platen and the panels subjected to this pressure until a 3% load compression had been obtained, when the control mechanism became operative. The panels were kept in the press for a total time of 10 minutes, the temperature being maintained at 280° F. and the applied pressure being determined by the control mechanism. Measurements of pressure exerted by the thrust platen, and of the degree of compression, were made at intervals of 1 minute.

Next the above procedure was repeated with the control apparatus set to obtain 5% and 7% compression, respectively, of the press load and, finally, as a control, it was repeated at the full pressure of 200 p. s. i. during the entire 10-minute period, during which the control apparatus was disconnected and inoperative. The results are summarized in Table I below and in the graphs of Figures 5 and 6, the values thereon being average values obtained for 20 panels pressed at each condition.

TABLE I

| Time (Minutes) | Pressure (p. s. i.) at indicated control setting | | | | Degree of Compression (percent by volume) at indicated control setting | | | |
|---|---|---|---|---|---|---|---|---|
| | 3% | 5% | 7% | None | 3% | 5% | 7% | None |
| 1 | 186 | 200 | 200 | 200 | 2.7 | 2.8 | 2.8 | 3.1 |
| 2 | 143 | 200 | 200 | 200 | 3.0 | 3.4 | 3.5 | 3.7 |
| 3 | 106 | 188 | 200 | 200 | 3.1 | 4.2 | 4.3 | 4.6 |
| 4 | 88 | 170 | 200 | 200 | 3.1 | 5.0 | 5.0 | 5.2 |
| 5 | 76 | 130 | 196 | 200 | 3.1 | 5.2 | 5.7 | 5.9 |
| 6 | 69 | 100 | 182 | 200 | 3.1 | 5.2 | 6.2 | 7.0 |
| 7 | 57 | 89 | 165 | 200 | 3.1 | 5.2 | 6.6 | 7.4 |
| 8 | 47 | 75 | 141 | 200 | 3.1 | 5.2 | 6.8 | 8.0 |
| 9 | 34 | 58 | 124 | 200 | 3.2 | 5.2 | 6.9 | 8.6 |
| 10 | 24 | 39 | 84 | 200 | 3.2 | 5.3 | 6.9 | 9.1 |

After removal from the press, the panels were conditioned to a moisture content of 9% and their degree of compression again measured. Also, their shear strength was measured in accordance with the method set forth in Commercial Standard CS–45–48 for Douglas fir plywood, and their wood failure determined by the conventional method, this being the estimated percent of wood failure in shear. The results are given in Table II, wherein the term "temporary compression" refers to the compression obtained during pressing while the term "permanent compression" refers to the degree of compression after conditioning to a 9% moisture content as described above.

TABLE II

| Control Setting | Temporary Compression (percent) | Permanent Compression (percent) | Shear Strength (p. s. i.) | Wood Failure (percent) |
|---|---|---|---|---|
| 3% | 3.2 | 1.1 | 232 | 87.7 |
| 5% | 5.2 | 2.8 | 257 | 92.5 |
| 7% | 6.9 | 3.6 | 278 | 92.4 |
| None | 9.1 | 5.0 | 293 | 86.5 |

From a consideration of the above results and of the graphs illustrated in Figures 5 and 6, it is apparent that the presently described method of making plywood affords a precise means of controlling the degree of compression of the plywood to a predetermined and optimum value. For example, as is illustrated in Figure 5, by setting the control at the desired compression value, this degree of compression when reached is maintained throughout the rest of the pressing operation. Thus when the control is set for a compression of about 3%, this degree of compression was reached after only 2 minutes, and thereafter maintained for the rest of the pressing period. Similarly the curve obtained when the control was set at 5% and 7%, respectively, flattened out and remained substantially constant, once these degrees of compression had been reached. This behavior is in direct contrast to the conventional procedure illustrated by the uncontrolled operation during which the degree of compression increases throughout the entire pressing period.

It is significant to note, as is shown in Table II, that the properties of the plywood were substantially as fully developed at 3% compression as they were at 9% compression obtained during uncontrolled operation. Thus the shear strength had increased only a small amount at the higher compression from 232 p. s. i. to 293 p. s. i., while the percent wood failure decreased slightly from 87.7% to 86.5%. The values obtained at 5% and 7% compression were comparable, the shear strengths being 257 and 278 p. s. i., respectively, and the wood failure values being 92.5 and 92.4%, respectively. From this, it is clear that superior bonding is obtained and hence superior strength at a compression value of the order of 3%, and that increasing the degree of compression serves only to crush the wood and to cause its loss through over compression.

Still further, as is immediately apparent from an inspection of Figure 6, the application of compression control by the presently described method results in substantial power savings. Thus, where 3% compression is desired and the control is operative, the pressure drops from the original and conventional 200 p. s. i. down to about 100 p. s. i. after only 4 minutes press time. Thereafter, it continues to decrease, reaching a terminal value after 10 minutes of only 24 pounds. Similarly, in the cases where 5% and 7% compression are effected, there is a rapid diminution of applied pressure and the resulting power saving is obvious.

It is to be understood that the forms of our invention, herewith shown and described, are to be taken as preferred examples of the same, and that various changes in the shape, size and arrangement of parts may be resorted to without departing from the spirit of our invention or the scope of the subjoined claims:

Having thus described our invention, we claim:

1. In combination, a press, including a thrust member and a hydraulic motor connected to the thrust member for advancing and retracting the same, thereby closing and opening the press, a fluid reservoir, a pump positioned for pumping fluid from the reservoir, first conduit means interconnecting the pump and the motor, second conduit means interconnecting the first conduit means and the reservoir, valve means in the second conduit means for controlling the flow of fluid therein, contact means attached to the thrust member, and valve control means connected to the valve means and positioned for actuation by engagement with the contact means, the valve control means operating the valve means upon engaging the contact means, thereby controlling the flow of fluid through the second conduit means in proportion to the movement of the contact means and maintaining the thrust member at a station in the press determined by the position of the contact means relative to the valve control means, said valve means comprising a diaphragm-actuated needle valve and the valve control means comprising a gas container divided into two chambers interconnected by an orifice, one of the chambers communicating with a source of gas and the other with the diaphragm-actuated needle valve, and lever means positioned to be contacted by the contact means and operable to control the flow of gas through said orifice, thereby determining the gas pressure exerted upon the diaphragm of the diaphragm-actuated needle valve and controlling the flow of fluid through the second conduit means.

2. A press assembly comprising a press including a thrust member and a fluid operated motor connected to the thrust member for advancing and retracting the same, thereby closing and opening the press, contact means connected to the thrust member of the press and adapted to move with the same, valve control means spaced apart from the contact means when the press is open and stationed for contact with the contact means after a predetermined closure of the press, motion amplifying means interposed between the contact means and the valve control means for amplifying the motion of the contact means, thereby increasing the sensitivity with which the valve control means responds to contact with the contact means, and valve means connected to the valve control means and operable to regulate the quantity of fluid supplied to the motor upon engagement and disengagement of the contact means with the valve control means and in proportion to the movement of the contact means when in contact with the valve control means, thereby maintaining the press at said predetermined closure for a predetermined time, said motion amplifying means comprising a first lever unsymmetrically fulcrumed intermediate its ends, a second lever spaced apart from the first lever and unsymmetrically fulcrumed intermediate its ends, a link interconnecting the long arm of the first lever and the short arm of the second lever, the short arm of the first lever being positioned for contact with the contact means and the long arm of the second lever being positioned for contact with the valve control means.

3. A press assembly comprising a press including a thrust platen and a fluid operated motor connected to the platen for advancing and retracting the same, thereby closing and opening the press, contact means attached to the thrust platen, valve control means spaced apart from the contact means when the press is open and positioned for contact with the contact means after a predetermined closure of the press, valve means actuatable by the valve control means in proportion to the movement of the contact means when in contact with the valve control means for controlling the flow of fluid supplied to the motor, and positioning means coordinated with the thrust platen for positioning the contact means a selected distance from the valve control means as determined by the thickness of the load in the press, said positioning means comprising an inclined plane having a predetermined slope relative to the direction of motion of the thrust platen, a first arm attached to the thrust platen and adapted to track on the inclined plane with movement of the platen, a second arm carrying the contact means, and means for reciprocably interconnecting the two arms whereby to effect the positioning of the contact means relative to the valve control means at a station commensurate with the extent of tracking of the first arm on the inclined plane.

4. A press assembly comprising a press including a thrust platen and a fluid operated motor connected to the platen for advancing and retracting the same, thereby closing and opening the press, contact means attached to the thrust platen, valve control means spaced apart from the contact means when the press is open and positioned for contact with the contact means after a predetermined closure of the press, valve means actuatable by the valve control means in proportion to the movement of the contact means when in contact with the valve control means for controlling the flow of fluid supplied to the motor, and positioning means coordinated with the thrust platen for positioning the contact means a selected distance from the valve control means as determined by the thickness of the load in the press, said positioning means comprising an inclined plane having a preselected slope relative to the direction of motion of the thrust platen, a first arm attached to the thrust platen and adapted to track on the inclined plane with movement of the platen, a second arm carrying the contact means, means for reciprocably interconnecting the two arms whereby to effect the positioning of the contact means relative to the valve control means at a station commensurate with the extent of tracking of the first arm on the inclined plane, and means for adjusting the slope of the inclined plane as required to effectuate a selected degree of compression of the press load.

5. In a press having a movable platen and a second platen and pressure-operated means to apply pressure to said movable platen to press said movable platen toward said second platen, the improvement which comprises contact means, movable means normally urged toward said contact means and in line with said contact means for engagement therewith and movement thereby when said movable platen has reached a predetermined distance from said second platen, at least one of said contact means and said movable means being carried by said movable platen for movement toward and away from said second platen with said movable platen, amplifier means to amplify the movement of said movable means and means responsive to said amplifier means to reduce the said pressure applied to said movable platen in proportion to the extent of movement of said movable means by said contact means.

6. In a press having a movable platen and a second platen and fluid means to apply pressure to said movable platen to press said movable platen toward said second platen, said fluid means comprising a piston connected to said movable platen, a cylinder for said piston and means to supply fluid to said cylinder, the improvement which comprises contact means, movable means normally urged toward said contact means and in line with said contact means for engagement therewith and movement thereby when said movable platen has reached a predetermined distance from said second platen, at least one of said contact means and said movable means being carried by said movable platen for movement toward and away from said second platen with said movable platen, amplifier means to amplify the movement of said movable means and means responsive to said amplifier means to reduce the said pressure applied to said cylinder in proportion to the extent of movement of said movable means by said contact means.

7. In a press having a movable platen and a second platen and fluid means to apply pressure to said movable platen to press said movable platen toward said second platen, said fluid means comprising a piston connected to said movable platen, a cylinder for said piston, a reservoir and a fluid supply conduit communicating between said reservoir and said cylinder, the improvement which comprises contact means carried by said movable platen, movable means positioned in line with and engageable by said contact means when said movable platen has reached a predetermined distance from said second platen, amplifier means to amplify the movement of said movable means, a second conduit communicating between said fluid supply conduit and said reservoir, said second conduit being provided with a valve normally preventing the flow of fluid through said second conduit and means responsive to said amplifier means to control said valve to controllably bleed off fluid supplied to said cylinder to reduce the said pressure in said cylinder in proportion to the extent of movement of said movable means by said contact means.

8. A press assembly as recited in claim 7 in which said valve comprises a diaphragm-actuated needle valve.

9. A press assembly as recited in claim 7 in which said valve comprises an electric motor valve.

10. In a press having a movable platen and a second platen and pressure-operated means to apply pressure to said movable platen to press said movable platen toward said second platen, the improvement which comprises contact means, movable means normally urged toward said contact means and in line with said contact means for engagement therewith and movement thereby when said movable platen has reached a predetermined distance from said second platen, at least one of said contact means and said movable means being carried by said movable platen for movement toward and away from said second platen with said movable platen, means responsive to said movable means to reduce the said pressure applied to said movable platen in proportion to the extent of movement of said movable means by said contact means, means for retracting said contact means away from said movable means at a uniform rate as said contact means approaches said movable means, and means for locking said contact means against further retraction so that said contact means may be locked when compression of the load is initiated with said contact means at a uniform distance from said movable means irrespective of minor variations in the thickness of the load being compressed.

References Cited in the file of this patent

UNITED STATES PATENTS

| | | |
|---|---|---|
| 610,524 | Cleveland | Sept. 13, 1898 |
| 1,329,402 | Henning | Feb. 3, 1920 |
| 1,863,448 | Landenberger et al. | June 14, 1932 |
| 2,009,487 | Ernst et al. | July 30, 1935 |
| 2,113,115 | MacMillin et al. | Apr. 5, 1938 |
| 2,148,704 | Merritt | Feb. 28, 1939 |
| 2,172,002 | Stanley | Sept. 5, 1939 |
| 2,358,353 | Stacey | Sept. 19, 1944 |
| 2,402,492 | Galber et al. | June 18, 1946 |
| 2,402,554 | Irvine et al. | June 25, 1946 |
| 2,433,132 | Lester | Dec. 23, 1947 |
| 2,433,672 | May | Dec. 30, 1947 |
| 2,442,422 | Loetscher | June 1, 1948 |

FOREIGN PATENTS

| | | |
|---|---|---|
| 484,407 | Germany | Feb. 28, 1928 |